United States Patent [19]

Collings

[11] Patent Number: 5,220,643
[45] Date of Patent: Jun. 15, 1993

[54] MONOLITHIC NEURAL NETWORK ELEMENT

[75] Inventor: Neil Collings, Peseux, Switzerland

[73] Assignee: STC PLC, United Kingdom

[21] Appl. No.: 528,597

[22] Filed: May 24, 1990

[30] Foreign Application Priority Data

May 24, 1989 [GB] United Kingdom ............... 8911917

[51] Int. Cl.$^5$ ................... H01J 31/50; G06F 13/00; G02B 6/10
[52] U.S. Cl. ............... 395/25; 250/214 LS; 364/822; 350/96.14; 385/8; 385/130
[58] Field of Search ............ 364/513, 807, 822, 713; 365/125; 350/96.14, 162.12; 357/17; 250/213; 395/25

[56] References Cited

U.S. PATENT DOCUMENTS

| | | | |
|---|---|---|---|
| 4,080,617 | 3/1978 | Dyment | 357/17 |
| 4,696,533 | 9/1987 | Kingston et al. | 350/96.14 |
| 4,729,111 | 3/1988 | Arrathoon et al. | 364/713 |
| 4,809,193 | 2/1989 | Jourjine | 364/513 |
| 4,860,253 | 8/1989 | Owechko et al. | 365/125 |
| 4,934,782 | 6/1990 | Soffer et al. | 350/162.12 |
| 4,985,621 | 1/1991 | Aull et al. | 250/213 |

FOREIGN PATENT DOCUMENTS

| | | |
|---|---|---|
| 2149176 | 6/1985 | United Kingdom . |
| 2149555 | 6/1985 | United Kingdom . |
| 2164759A | 3/1986 | United Kingdom . |
| 2166256 | 4/1986 | United Kingdom . |
| 2188742 | 10/1987 | United Kingdom . |
| 87/00411 | 10/1987 | World Int. Prop. O. . |

OTHER PUBLICATIONS

Athale et al., "Compact Architectures for Adaptive Neural Nets", Optical Engineering, Apr. 1989, pp. 447–455.

Applied Optics vol. 26 No. 23 1st Dec. 1987 pp. 5055–5060 C. C. Guest et al. "Designs and devices for optical bidirectional associative memories".

Computer vol. 20 No. 12 Dec. 1987 pp. 9–23 J. J. Sluss et al. "An introduction to integrated optics for computing".

Optics Communications vol. 70 No. 5 1st Apr. 1989 pp. 369–372 B. Javidi et al. "Deconvolution using non-linear joint transform correlator".

"CMOS Detector Cells for Holographic Optical Interconnects in Microcircuits" W. H. Wu et al (SPIE vol. 752 Digital Optical Computing (1987) pp. 192–199).

*Primary Examiner*—Michael R. Fleming
*Assistant Examiner*—Robert W. Doans
*Attorney, Agent, or Firm*—Lee, Mann, Smith, McWilliams, Sweeney & Ohlson

[57] ABSTRACT

A neural plane, which can form the basis of a neural network or a component thereof, is comprised by an optical modulator, an electrical non-linearity circuit and an optical detector interconnected whereby in use the non-linearity circuit controls the modulator in dependence on the detector output. There are parallel arrays (10, 11, 12) of such modulators, non-linearity circuits and detectors (M, T, D, 30, 33, 34). The modulator, non-linearity circuits and detectors have components formed in a common semiconductor substrate (20), for example by VLSI techniques with a silicon substrate, the modulators (30) may be comprised by liquid crystal on silicon in that case (FIGS. 4, 7).

4 Claims, 4 Drawing Sheets

ROW OF DETECTORS.
PRIOR ART
COLUMN OF LIGHT SOURCES.
MASK M

FIG. 4
| M1 | T1 | D1 |
|----|----|----|
| M | T | D |
| M | T | D |
| M | T | D |
| M | T | D |
| M | T | D |
| M | T | D |
| M | T | D |
FIG. 5
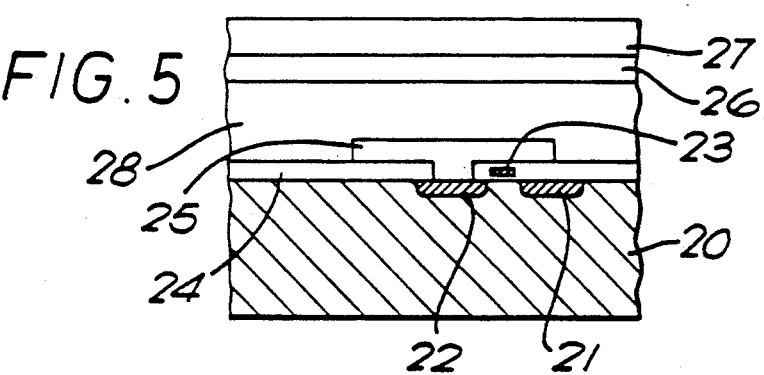
FIG. 6
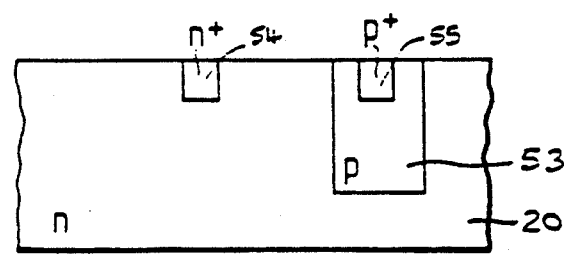

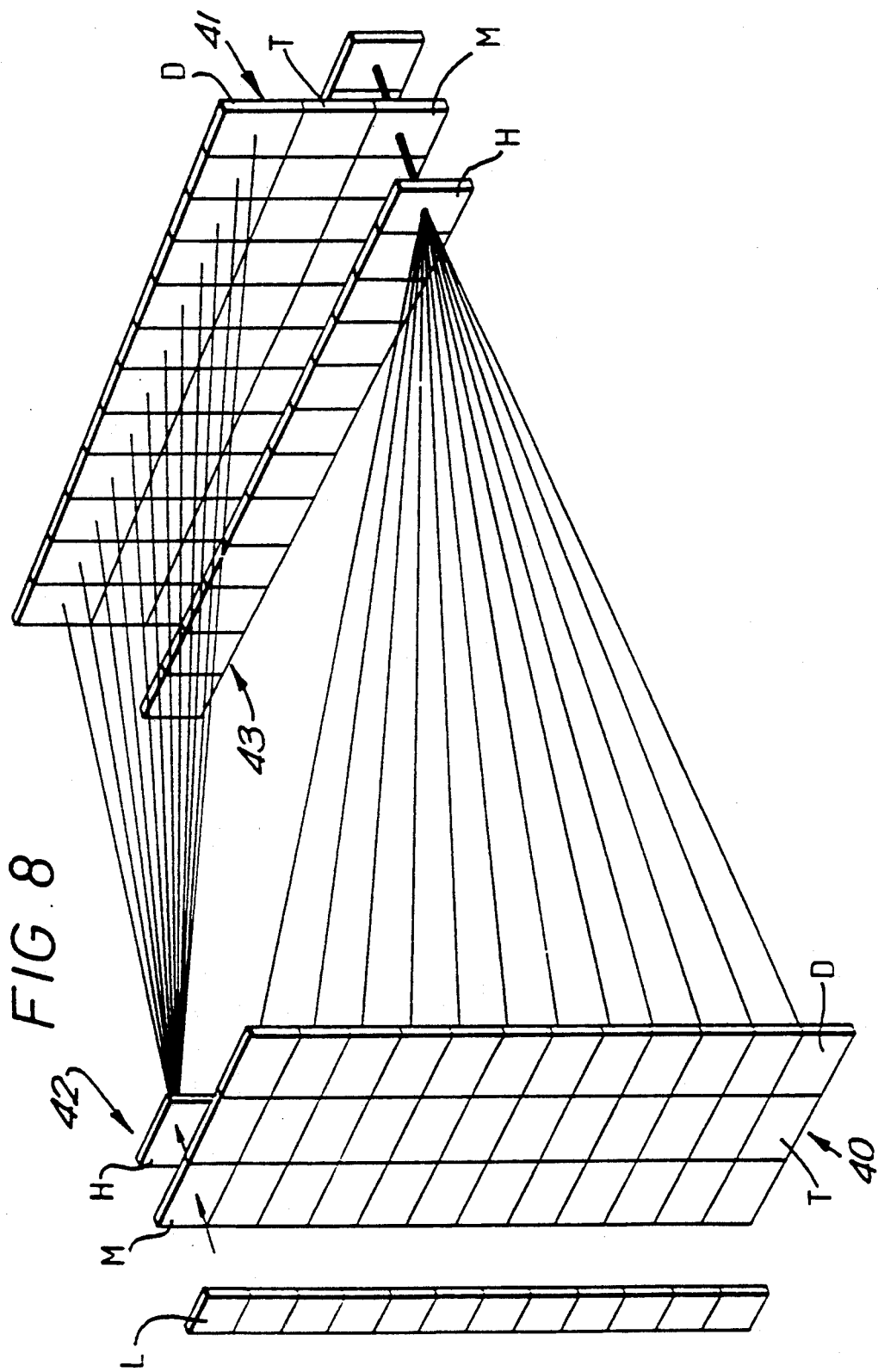

MONOLITHIC NEURAL NETWORK ELEMENT

BACKGROUND OF THE INVENTION

This invention relates to neural networks and in particular to components therefor.

Neural networks are parallel distributed systems for processing information in a non-algorithmic way and are basically pattern recognition systems. Typical applications are for error correcting sub-systems in optical communications links, for associated memories in computing systems and for maintaining and controlling production lines where precise analytical procedures are not feasible and the control system has to be trained using expert knowledge. Optics is regarded as a promising technology for neural networks because of the ability to provide, economically, massively parallel interconnections. Common features uniting many neural network architectures are the multiplication of an input vector by a matrix of weights, followed by the application of a non-linear threshold to the components of the product vector. For those neural networks which can be represented mathematically by a matrix-vector multiplication, a conventional arrangement for the optical implementation of such a neural network is shown in FIG. 1 of the accompanying drawings. An input vector $S=[S_1 S_2 \ldots S_N]^T$ is realised as a column of stabilised light sources each of which illuminates uniformly a single row of pixels in a mask (matrix) $M=[M_{ij}]$. Optical routing devices (lenses or holograms) ensure that the light passing through the jth column of the mask is collected by the photodetector $D_j$. The output vector is the row $D=[D_1 D_2 \ldots D_N]$. The intensity $I_j$ of the light falling on the jth photodetector is $$I_j = \sum_i I_o S_i M_{ij}.$$

For example, in the Hopfield model [J. J. Hopfield, Proc. Nat. Acad. Sci. U.S.A. 79, 2554-58 (1982)] $S_i$ takes binary values, $M_{ij}$ may take analogue values in the range 0 to 1 and the threshold is "hard". $I_o$ is the intensity when only one source and one pixel are fully on. In the simplest version, a feedback arrangement is required which switches the source $S_j$ according to the conditions.

$S_j = 1$ (ON) when $I_j > \theta_j$ $S_j = 0$ (OFF) when $I_j \leq \theta_j$ where $\theta_j$ is a controllable threshold value. This is a "hard" threshold example.

When an arbitrary input vector is presented by forcing a pattern on the light sources for a short period, the system responds by finding and displaying the nearest matching pattern stored in the mask.

An optical neural network of this type is described, for example, in "Designs and devices for optical bidirectional associative memories" C. Guest et al. Applied Optics Vol 26, No. 23, 1 December 1987 p.5055-5060. A compact bidirectional associative memory implementation described therein employs a spatial light modulator device which comprises an array of single element detectors paired with optical modulators of a similar form. Light falling on a detector causes its associated modulator to become more transparent. The known spatial light modulator device shown in FIG. 2 of the accompanying drawings consists of alternating stripes of silicon photodetectors 1 and electro-optic modulators 2. The signal from each detector is amplified and thresholded by silicon drive circuitry 3 that then drives the associated modulator. Two such device arrays orientated orthogonally with a connection matrix (mask) 4 therebetween are used to implement an optical bidirectional associative memory (FIG. 3). The connection matrix may be a transparency. Light is introduced onto both faces of the resulting array. It is suggested in the aforementioned article that such spatial light modulator devices may be comprised by a hybrid system with silicon detectors and circuitry and PLZT modulators.

An object of the present invention is to provide a spatial light modulator by means of an alternative technology and hence to provide a so-called neural plane which is a basic element for neural networks and components thereof.

SUMMARY OF THE INVENTION

According to one aspect of the present invention there is provided a neural plane including an optical modulator, an electrical non-linearity circuit and an optical detector interconnected whereby in use the non-linearity circuit controls the modulator in dependence on the detector output, wherein there is a common semiconductor substrate for the modulator, the non-linearity circuit and the detector and components of each thereof are formed in the substrate.

Preferably there are a plurality of said optical modulators disposed in a linear array, a plurality of said non-linearity circuits disposed in a respective linear array and a plurality of said detectors disposed in a respective linear array, which arrays are disposed in parallel, each optical modulator being associated with a respective non-linearity circuit and a respective detector.

An optical neural network module may include a first neural plane according to the preceding paragraph together with a plurality of optical sources disposed in a linear array with each optical source arranged to supply an optical signal to a respective modulator of the array thereof, and comprising a plurality of holograms disposed in a linear array such that each hologram is able to receive an optical signal from a respective modulator of the array thereof, which holograms each serve to diffract the respective received optical signal into a plurality of beams and to apply weights thereto according to a predetermined network algorithm.

BRIEF DESCRIPTION OF THE DRAWINGS

Embodiments of the invention will now be described with reference to FIGS. 4 to 10 of the accompanying drawings, in which

FIG. 4 illustrates, schematically, a neural plane according to one embodiment of the present invention;

FIG. 5 illustrates a cross-section through a typical liquid crystal on silicon modulator FIG. 6 illustrates a CMOS detector FIG. 8 illustrates an embodiment of a fixed interconnect optical neural network module employing neural planes as illustrated in FIG. 4;

DESCRIPTION OF THE PREFERRED EMBODIMENT

Figure 1:
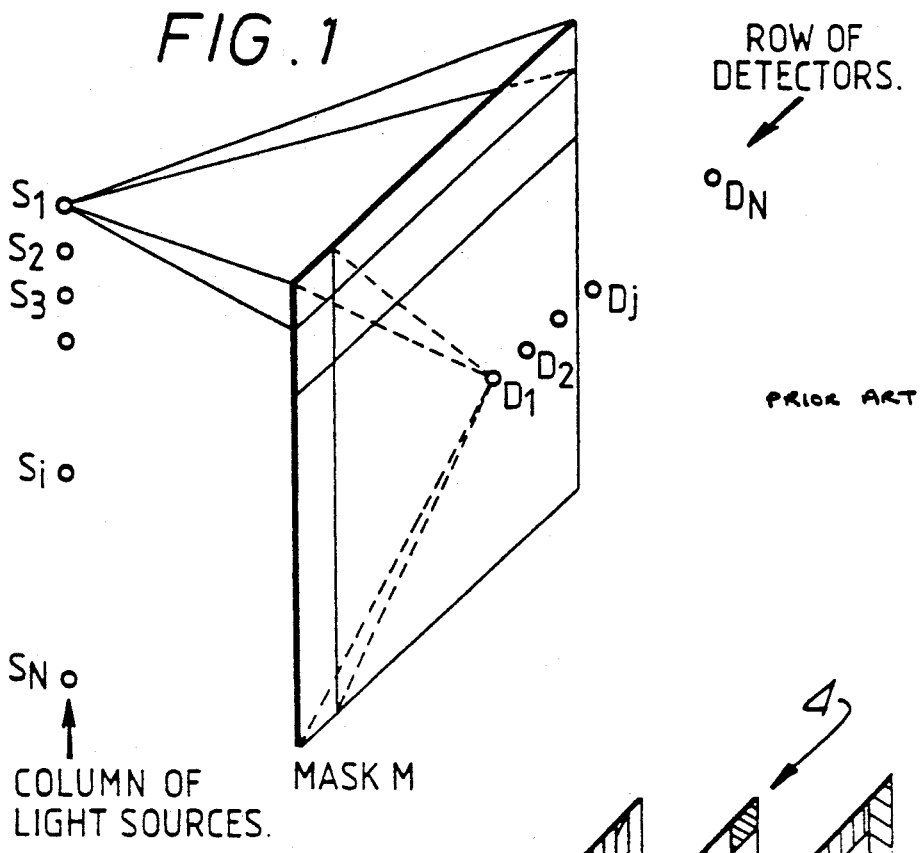
FIG. 1 illustrates a conventional arrangement for an optical neural network.
Figure 3:
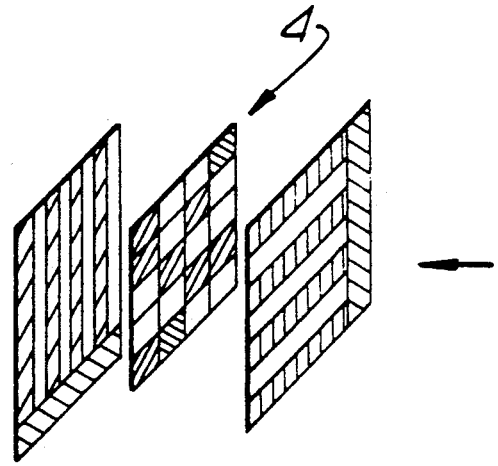
FIG. 3 illustrates an optical implementation of a bidirectional associative memory.
Figure 2:
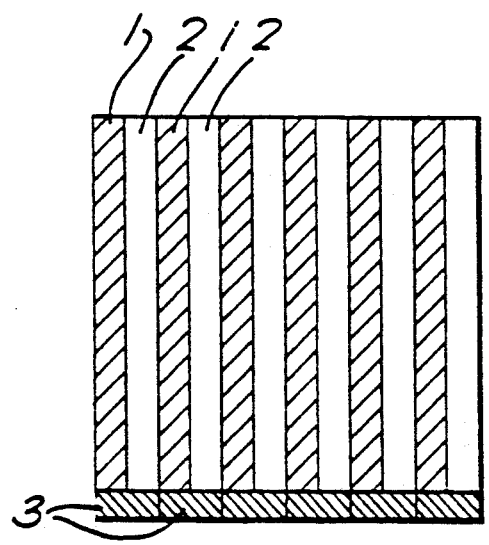
FIG. 2 illustrates a known spatial light modulator.

The known spatial light modulator described above (FIG. 2) comprises alternating stripes of silicon photodetectors 1 and electro-optic modulators 2, with respective threshold circuitry 3 disposed at the ends of pairs of the stripes. Such an arrangement is relatively compact but is disadvantageous as a result of being slow due to inherent capacitance.

The spatial light modulator structure of the present invention is particularly compact and may be fabricated using VLSI techniques for its detector, threshold (non-linearity) and modulator sections. A schematic arrangement is shown in FIG. 4. It comprises an array 10 of optical modulators M which are, for example, in the form of liquid crystal on a silicon substrate, an array 11 of threshold circuits T, one circuit for each modulator for example, in the form of VLSI circuitry on the same silicon substrate and an array 12 of photodetectors D, for example in the form of appropriate VLSI components on the same silicon substrate, one photodetector for each threshold circuit. The arrays 10, 11, 12 are linear and parallel as indicated. The electrical output of photodetector D1 is applied to threshold circuit T1 which causes the modulator M1 to be changed if appropriate.

The modulator of array 10 may comprise liquid crystal cells disposed on the silicon substrate which includes circuitry whereby the cells are addressed and operated. Preferably the liquid crystal is a ferro-electric liquid crystal. Attention is directed to GB patents 2149555B and, 2149176B, and GB applications 2166256A and 218874A (assigned to the same assignee as the present application) which describe various aspects of the structure and operation of ferro-electric liquid crystal displays that may form the basis of the modulators 10. FIG. 5 illustrates a cross-section through a form of ferro-electric liquid crystal modulator. There is a silicon substrate 20, an FET comprised by source and drain regions 21, 22 and a gate 23 in a silicon dioxide layer 24 which is apertured to provide electrical contact between a transparent electrode 25 and drain 22. Another transparent electrode 26 is provided on a transparent panel 27. A ferro-electric liquid crystal material 28 is disposed between the electrodes 25 and 26. The cell may be operated by applying a control signal to the gate such that the electrode 25 is driven to a positive or negative voltage relative to the other electrode 26, so as to switch the ferro-electric liquid crystal material between its two stable states, i.e. cause it to appear light or dark, for example.

The threshold circuits (non-linearity circuit) comprise suitable non-linear circuitry formed in the same silicon substrate 20 as components of the modulators. Examples of such circuitry in the general case include the following basic types, namely: hard-limiter, sigmoid, pseudo-linear or sinusoidal, which types have previously been suggested for use with the neural networks.

The detectors are comprised by CMOS detectors formed in the same silicon substrate 20 (FIG. 6). Such detectors are presently the easiest to make in silicon and may comprise a p-well implant 53 into n-type silicon together with n+ and p+ contacts 54, 55, thus producing a pn junction (diode) which will respond to incident light and produce an electrical output for application to the threshold circuitry that causes the state of the modulator to be unchanged or to change according to whether the received light exceeds a threshold limit. Such CMOS detectors are described in "CMOS detector cells for holographical optical interconnects in microcircuit" W. H. Wu et al. SPIE Vol 752 Digital Optical Computing (1987) pp 192–199.

Figure 7:
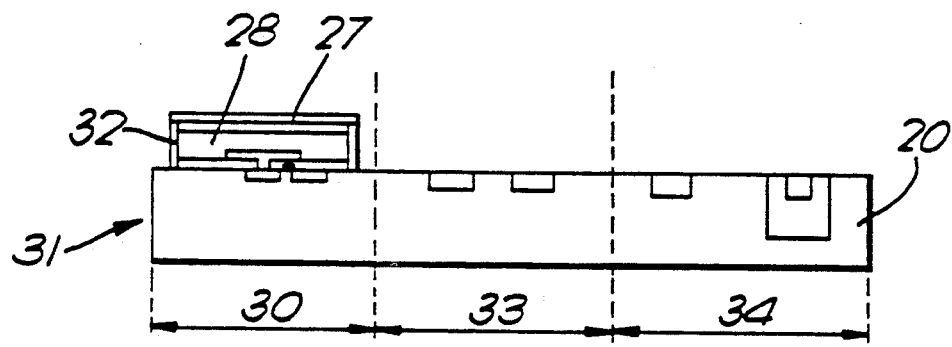
FIG. 7 illustrates a cross-section through a neural plane substrate

The liquid crystal material 28 is confined to the modulator area 30 of the silicon element 31 by suitable definition of a perimeter seal indicated schematically in FIG. 7 which secures the transparent panel 27 to the underlying material and forms an hermetically sealed envelope for the liquid crystal material. FIG. 7 also indicates the threshold circuitry area at 33 and the detector area at 34. The silicon element 31 having the integral array of modulators, threshold circuitry and detectors formed by VLSI and liquid crystal technology is referred to herein as a neural plane and is considered to be particularly advantageous in view of its compact structure and being readily manufactured by conventional techniques. Such a neural plane can comprise a basic unit for various neural network components. The liquid crystal can, alternatively, also cover the photodetector and this will facilitate manufacture. It is necessary to ensure that (i) the liquid crystal is always transmitting over the detector and (ii) there is some method of isolating the modulator drive circuitry from photoactivation by the write light falling on the detector. Point (i) may be implemented by having a drive pad at the photodetector which drives the liquid crystal into the state which produces transparency. Point (ii) may be implemented by (a) spatial separation e.g. focussing modulator (read ) and detector (write) beams on their respective locations; (b) wavelength separation e.g. using different wavelengths for read and write; (c) temporal separation e.g. pulsing the write light and the read light. It is currently preferred to incorporate (a) and (c) in the system, however in a two-layer net to be referred to hereafter, care must be taken that the detectors of one layer are not enabled when writing on the other layer, or they may pick up stray light.

Figure 10:
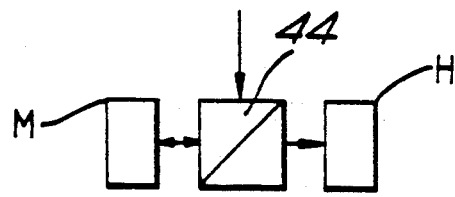

An example of a use for such a neural plane will now be described with reference to FIG. 8 which comprises a compact fixed module consisting of a two layer net with fixed interconnects. Modules with more than two layers can, however, be envisaged. The module employs two neural planes 40 and 41 which are arranged orthogonally as indicated. Associated with each modulator M of the neural planes is a respective laser source L. The embodiment is a transmissive mode embodiment, so that in dependence on the state of a modulator, light from the respective laser source can be transmitted through the modulator to a respective hologram H. The holograms H are arranged in an array (42, 43) disposed parallel to the modulator array. In the case of a modulator which is not transmissive, the laser sources would be arranged at the side as indicated in FIG. 10 and the system operated in reflex mode. A polariser 44 between the modulator M and the hologram H serves to direct an input laser beam which has a first polarisation state to the modulator and to direct a reflected beam, which the modulator has rotated to an orthogonal polarisation state, to the hologram H. Liquid crystal on silicon can be used as a transmissive structure beyond the band edge of the silicon (beyond 1 μm) with laser sources at 1.3 μm or 1.5 μm. However, for shorter wavelengths the reflex mode is required.

Whereas holograms have been proposed in previous neural networks their purpose was simply for light diffraction. The holograms of the module of FIG. 8 serve for diffraction and also to apply weights to the diffracted beams according to the network algorithm used. The resolution of the hologram is required to be sufficiently high to achieve this and they may thus be comprised by electron beam computer generated holograms. For such holograms, wavelengths shorter than the band edge of silicon would be advantageous since more information can be packed into the hologram, in which case use in reflex mode (FIG. 10) would be required.

Figure 9:
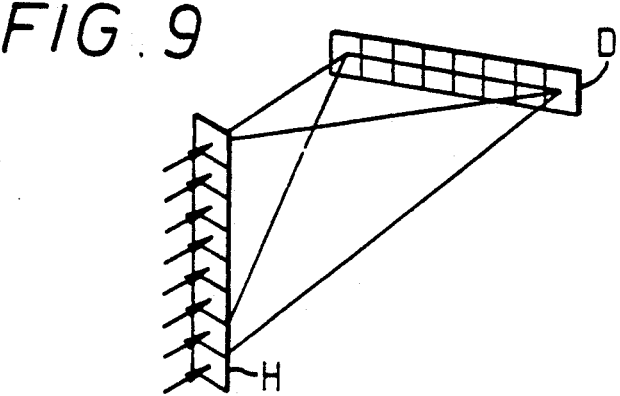
FIG. 9 illustrates the tetroidal shape of the overall beam between the holograms and the detector of the opposite neural plane and FIG. 10 illustrates part of a module similar to that of FIG. 8 but which employs a reflect rather than transmissive arrangement for the light input/the modulator.

Neural networks are, in the main, trained in use by presenting them with examples. The modulator shown in FIG. 8 is a fixed arrangement, fixed patterns for recognition being stored in the holograms, and serves as an example of a possible use of the neural plane described above. Each modulator M of the linear array thereof in neural plane 40 impresses an input vector on the beam from the respective light source. The output of each modulator is diffracted to each element of the detector array of neural plane 41 by the respective hologram of array 42 and weighted by the said hologram. FIG. 9 only shows, for reasons of clarity, the beam diffracted to the detector by one element of each hologram array. Each hologram produces a corresponding set of beams which are directed to the detector array so that the beams together form a tetroidal shape as indicated in FIG. 9, which shows only one hologram array and the receiving detector array. Each detector of the array effectively sums the light falling thereon from the various holograms and produces a corresponding electrical output, which is applied to the respective threshold circuit that causes appropriate actuation or not of the respective modulator of neural plane 41. Light from the sources associated with neural plane 41 is then modulated accordingly, i.e. a vector is impressed thereon and the hologram array associated with neural plane 41 diffracts and weights the modulated light beams, which are then detected by the detectors of the neural plane 40, summed in each detector, applied to the threshold circuitry and causes respective actuation or not of the modulators of neural plane 40.

In order to cause the module to indicate that a particular pattern, or a near match thereto, is present in the hologram i.e. to perform pattern recognition, the pattern to be recognised is impressed on the modulators associated with the neural plane 40 by appropriate electrical input thereto, to render some transmissive and some not, for example. The laser sources at the neural plane 40 are then set off, preferably pulsed, so that light is passed to the holograms in accordance with the settings of the modulators. The detectors at the neural plane 41 sum the diffracted and weighted beams as described above, the outputs are applied to respective threshold circuits and the outputs thereof employed to set the modulators of neural plane 41 accordingly. When valid information is available for this purpose and the modulators are set, the laser sources at the neural plane 41 are pulsed and the information is transferred back to the neural plane 40 by diffraction, together with weighting, by the hologram array 43. The output of the detectors of neural plane 40 is thresholded and employed to change the state of the modulators of neural plane 40 as appropriate. This cycle is continued until the modulators of neural plane 40 settle down to a pattern, which pattern is the input pattern or a near match thereto. That is, the system in response to an input pattern will converge to one of the solutions which is programmed in the hologram. When this is achieved the recognised pattern or rather corresponding electrical outputs of the modulator can be read out and can be employed elsewhere as required, these outputs corresponding to a recognised pattern or near match thereto. In the case of a transmissive mode of operation a further element will be necessary, namely a beam splitter to monitor the impressed vector so that when the vector is the same for, say, two successive light pulses it will be known that the system has settled down to a relevant state. The use of light pulses also provides an efficient manner for synchronising the operation of the system elements.

In order for the system to recognise certain patterns those patterns or corresponding solutions have to be programmed into the hologram as well as means to cause the fan-out (diffraction). This involves determining the weights necessary to be applied to the fanned out beams to produce a far-field intensity pattern corresponding to each pattern which can be recognised, for example a row of variable intensity spots, taking the Fourier transform of this far-field intensity pattern and inverting it to give what is required at the hologram.

Whereas the above refers to silicon as the substrate, alternatively, other semiconductors can be used. Furthermore other liquid crystals than ferro-electric can be used although the latter are currently preferred in view of their operating speed. In particular, the chiral smectic A electroclinic effect offers the possibility of grey scale modulation. VLSI techniques are referred to above specifically but alternatively other processing techniques can be used. The detectors may also be other than the CMOS version described above. Components of each of the modulator, non-linearity circuit and detector are formed in the common substrate. In addition, the neural network may perform a function other than associative memory. For example, it may serve a control function.

In comparison with the known spatial light modulator described above, the modulator elements M are not extended to a length corresponding to that of the opposite detector since fan-out is achieved by the hologram; the detector elements are not disposed directly "under" the modulator elements so that less space is required in the vertical direction, and since the modulators, detectors and threshold elements are all arranged in respective adjacent arrays and all formed by VLSI techniques on the same substrate, a particularly compact structure is achieved.

I claim:

1. An optical neural network module including a first neural plane comprising a plurality of optical modulators juxtaposed in a linear array, a plurality of electrical non-linearity circuits juxtaposed in a respective linear array and a plurality of detectors juxtaposed in a respective linear array, which arrays are disposed in physical parallelism with one another and with the array of non-linearity circuits disposed between the modulator and detector arrays, each optical modulator being associated with a respective non-linearity circuit and a respective detector, wherein each said detector, whose output is in electrical form, has an output port connected to an input port of the associated non-linearity circuit, and an output port of the non-linearity circuit is connected to an input port of the associated optical modulator, whereby in use each non-linearity circuit controls the associated modulator in dependence on the associated detector, wherein there is a common semiconductor substrate for the modulators, non-linearity circuits and detectors and components of each thereof are formed in the substrate, comprising a plurality of optical sources juxtaposed in a respective linear array in physical parallelism with said modulator, non-linearity circuit and detector arrays, each optical source being associated with, and arranged to supply an optical signal to, a respective modulator of the array thereof, and comprising a plurality of holograms juxtaposed in a respective array in physical parallelism with said modulator, non-linearity circuit and detector arrays, each hologram being associated with, and arranged to receive an optical signal from, a respective modulator of the array thereof, which holograms each serve to diffract the respective received optical signal into a plurality of beams and to apply weights thereto according to a predetermined network algorithm, and including a second neural plane comprising another plurality of optical modulators juxtaposed in a respective linear array, another plurality of electrical non-linearity circuits juxtaposed in a respective linear array, another plurality of detectors juxtaposed in a respective linear array, another plurality of optical sources juxtaposed in a respective linear array, and another plurality of holograms juxtaposed in a respective linear array, the second neural plane arrays being disposed in a physical parallelism with one another, the second neural plane being spaced from the first neural plane and orthogonal thereto, and wherein each detector of the second neural plane receives a respective beam diffracted and weighted by each hologram associated with the first neural plane and sums them, wherein each modulator of the second neural plane is controlled by the output of the respective detector of the second neural plane, and wherein each of the optical sources associated with the second neural plane is arranged to supply an optical signal to the respective modulator of the second neural plane array thereof and thence to the respective hologram of the second neural plane array thereof, which respective hologram diffracts the output signal output from the respective modulator into a plurality of beams and weights them according to said network algorithm, which diffracted and weighted beams are detected by the detectors of the first neural plane and summed thereby, and wherein each modulator of the first neural plane is controlled by the output of the respective detector of the first neural plane.

2. An optical neural network module as claimed in claim 1 and including means for setting the modulators and means for actuating the light sources, wherein the network algorithm is such that the holograms contain a plurality of patterns which the module can recognise, wherein in use a pattern to be recognised is impressed on the modulators of the first neural plane by the application of corresponding electrical inputs to the means for setting the modulators whereby to set the modulators of the first neural plane in accordance with the pattern to be recognised, wherein the light sources associated with the first neural plane are actuated by the respective actuating means whereby light is passed to the holograms associated with the first neural plane in accordance with the setting of the modulators and thence to the detectors of the second neural plane, the second neural plane modulators being set in accordance with the light detected by the second neural plane detectors and the outputs of the second neural plane non-linearity circuits, wherein the light sources associated with the second neural plane are then actuated by the respective actuating means and corresponding optical signals are passed to the detectors of the first neural plane, the modulators of the first neural plane being set in accordance with the light detected by the first neural plane detectors and the outputs of the first neural plane non-linearity circuits, which cycle of operations is repeated until the modulators of the first neural plane are set to one of the patterns contained in the holograms which corresponds to the pattern to be recognised.

3. A module as claimed in claim 1, wherein the modulators are transmissive modulators and in both the first and second neural planes the respective array of modulators is disposed between the respective optical source and hologram arrays.

4. A module as claimed in claim 1, wherein the modulators are reflexive mode modulators.

* * * * *